(12) United States Patent
Weiner

(10) Patent No.: US 8,917,849 B2
(45) Date of Patent: *Dec. 23, 2014

(54) METHOD AND END-USER DEVICE FOR MESSAGING

(71) Applicant: Moshe Weiner, Yehud (IL)

(72) Inventor: Moshe Weiner, Yehud (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,515

(22) Filed: Jun. 3, 2013

(65) Prior Publication Data

US 2013/0279681 A1    Oct. 24, 2013

Related U.S. Application Data

(63) Continuation of application No. 13/323,362, filed on Dec. 12, 2011, now Pat. No. 8,483,207, which is a continuation of application No. 10/553,204, filed as application No. PCT/IL2004/000370 on May 2, 2004, now Pat. No. 8,160,054.

(60) Provisional application No. 60/527,282, filed on Dec. 8, 2003, provisional application No. 60/527,283, filed on Dec. 8, 2003, provisional application No. 60/468,635, filed on May 8, 2003.

(51) Int. Cl.
    *H04L 12/28* (2006.01)
    *H04M 3/42* (2006.01)
    *H04M 11/10* (2006.01)

(52) U.S. Cl.
    USPC ............ 379/207; 379/211; 370/351; 455/413

(58) Field of Classification Search
    USPC .......... 370/260–328, 351–359; 379/207–211; 455/412–417
    See application file for complete search history.

(56) References Cited

U.S. PATENT DOCUMENTS

| | | | |
|---|---|---|---|
| 6,215,857 B1 | 4/2001 | Kasiviswanathan | |
| 6,240,391 B1 | 5/2001 | Ball et al. | |
| 6,418,307 B1 | 7/2002 | Amin | |
| 6,763,226 B1* | 7/2004 | McZeal, Jr. | 455/90.2 |
| 6,771,949 B1 | 8/2004 | Corliss | |
| 6,990,180 B2* | 1/2006 | Vuori | 379/88.25 |
| 7,013,155 B1 | 3/2006 | Ruf et al. | |
| 7,197,122 B2* | 3/2007 | Vuori | 379/88.25 |
| 7,454,000 B1* | 11/2008 | Henderson | 379/142.04 |
| 7,526,073 B2* | 4/2009 | Romeo | 379/88.18 |
| 7,535,890 B2* | 5/2009 | Rojas | 370/352 |
| 2002/0006782 A1 | 1/2002 | Kim | |
| 2002/0136217 A1 | 9/2002 | Christensen | |
| 2002/0146097 A1 | 10/2002 | Vuori | |

(Continued)

FOREIGN PATENT DOCUMENTS

| CA | 02355420 | 2/2002 |
|---|---|---|
| CN | 1387364 A | 12/2002 |

(Continued)

*Primary Examiner* — Man Phan

(57) ABSTRACT

An end-user device and method for messaging, includes: enabling an initiating user, using an end-user device, to choose at least one target user and to subsequently press a dedicated button selected from a set of dedicated buttons that includes one or more dedicated buttons; and in response to pressing the dedicated button preceded by choosing the at least one target user, enabling sending to the at least one target user a respective message, wherein a type of the respective message corresponds to the dedicated button, pressed by the initiating user.

17 Claims, 15 Drawing Sheets

(56) References Cited

U.S. PATENT DOCUMENTS

| | | |
|---|---|---|
| 2003/0028602 A1 | 2/2003 | Bhattacharya |
| 2003/0118160 A1 | 6/2003 | Holt et al. |
| 2003/0174815 A1 | 9/2003 | Didcock |
| 2003/0193961 A1 | 10/2003 | Moore et al. |
| 2004/0003046 A1 | 1/2004 | Grabelsky et al. |
| 2004/0072593 A1 | 4/2004 | Robbins et al. |
| 2006/0040643 A1* | 2/2006 | O'Connor ............... 455/412.1 |
| 2006/0046698 A1* | 3/2006 | O'Brien .................... 455/413 |
| 2006/0256940 A1* | 11/2006 | Pekarovic et al. ........ 379/88.26 |
| 2010/0172483 A1* | 7/2010 | Weiner .................. 379/211.02 |
| 2012/0275452 A1* | 11/2012 | Rojas ....................... 370/352 |

FOREIGN PATENT DOCUMENTS

| | | |
|---|---|---|
| EP | 1185068 A2 | 3/2002 |
| JP | 2001-326737 A | 11/2001 |
| KR | 2001-008182 | 2/2001 |
| KR | 2001-0074556 | 8/2001 |
| WO | 00/47005 | 8/2000 |
| WO | 02/30010 | 9/2001 |
| WO | 03/026261 | 3/2003 |
| WO | 03/055191 | 7/2003 |

* cited by examiner

FIG. 1b

| 152 | 0544123456 | 789 |

| 152 | * | 0541123456#0542234567 |

160   162   164

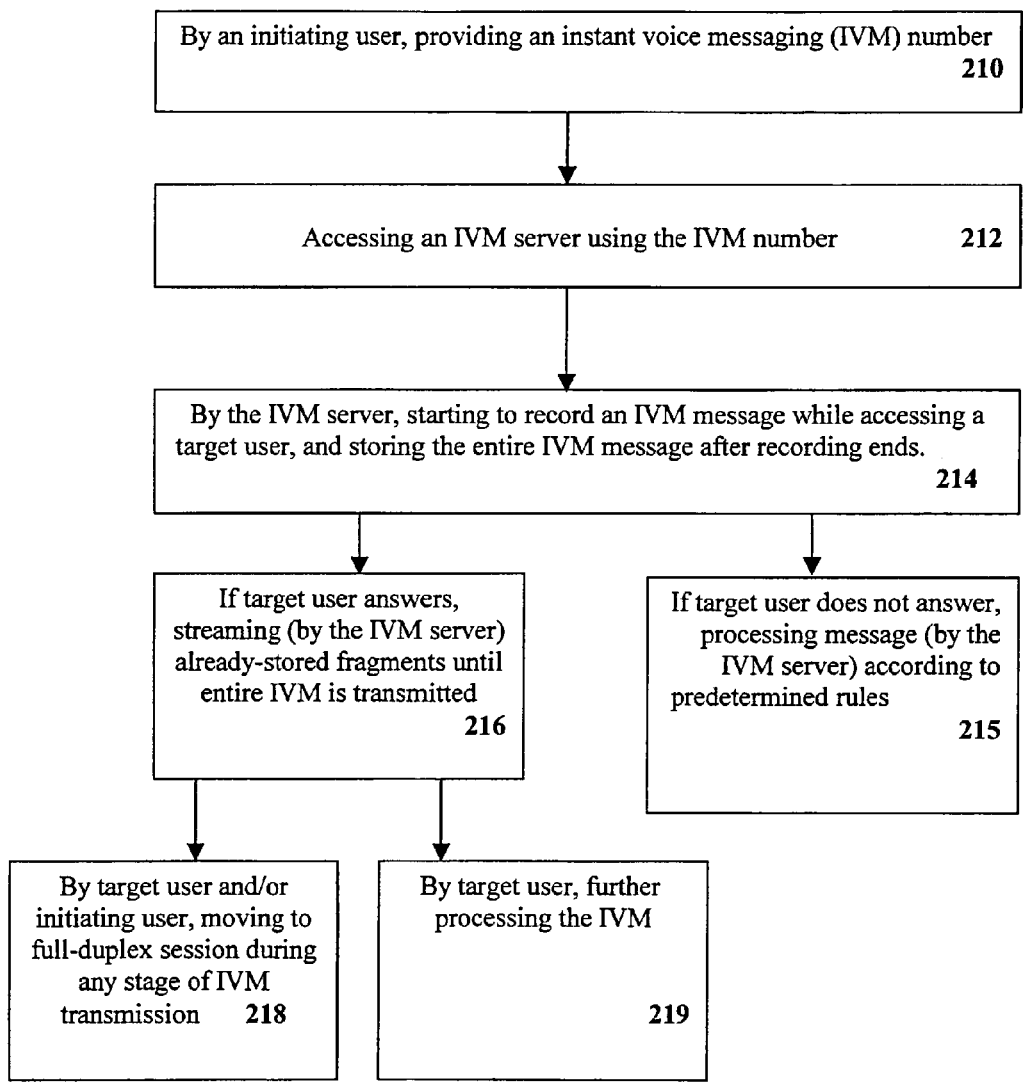

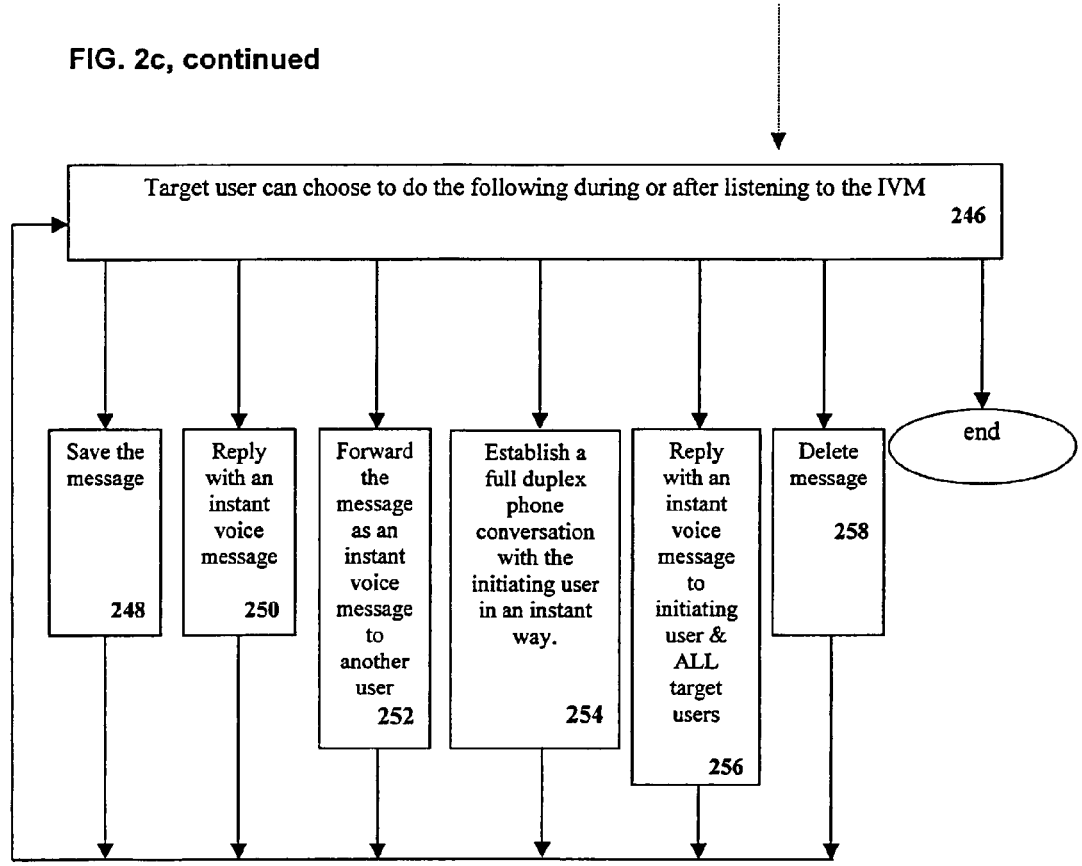
FIG. 2c, continued

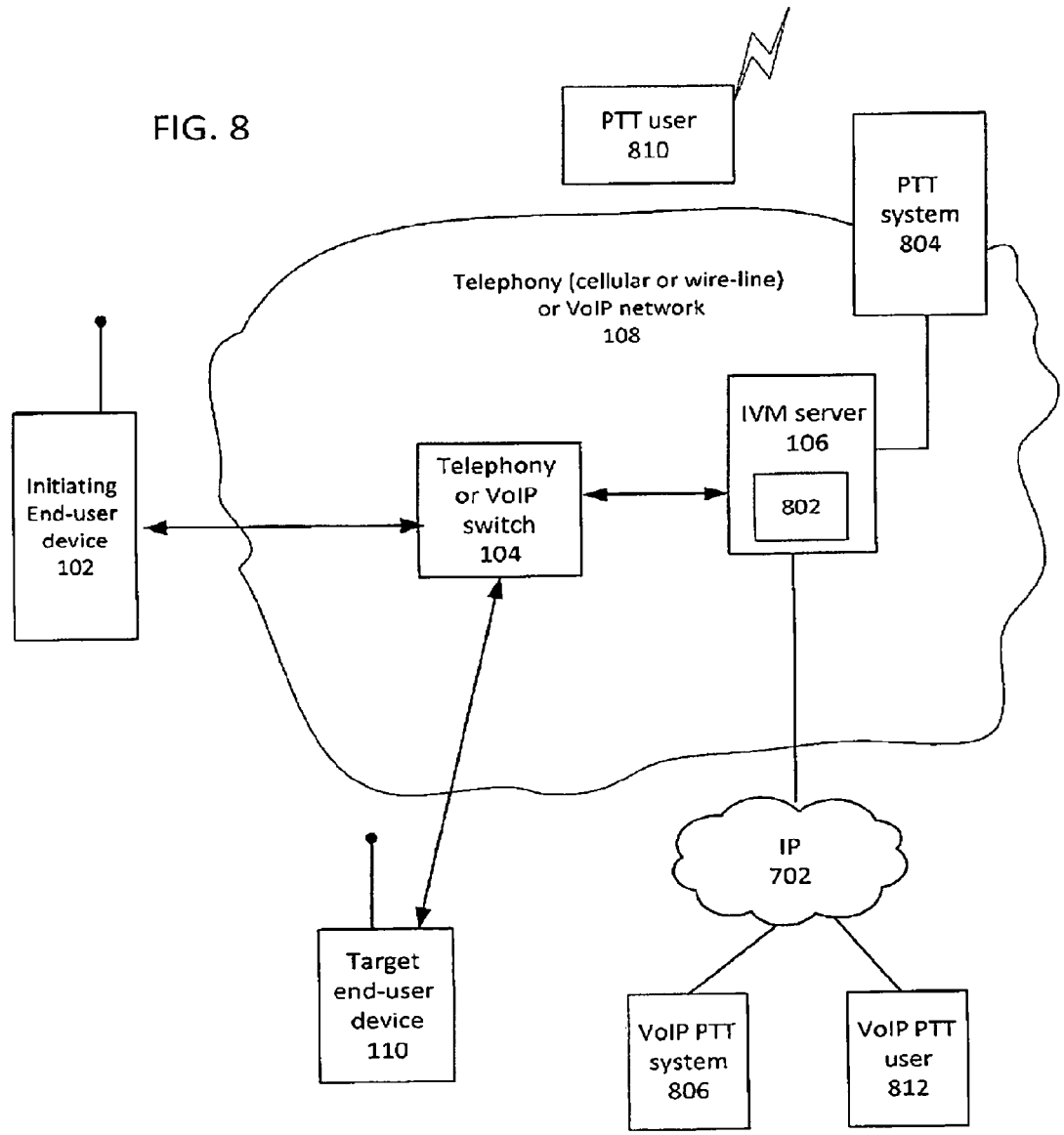

METHOD AND END-USER DEVICE FOR MESSAGING

CROSS REFERENCE TO RELATED APPLICATIONS

This application is a continuation of U.S. Pat. No. 8,483,207, filed on Dec. 12, 2011, which is a continuation of U.S. Pat. No. 8,160,054.

FIELD OF THE INVENTION

The present invention relates to telecommunications, in particular wire-line and wireless telephony and telephony signaling systems, and communications carried over public switching telephony networks such as PSTN (Public Switched Telephone Network) and PLMN (Public Land Mobile Network) and Voice Over Internet Protocol (VoIP), and more specifically to signaling system No. 7 (SS7). The present invention also relates to cellular telephony technologies, both $1^{st}$ generation ("1G", i.e. analog cellular technology), $2^{nd}$ generation ("2G", e.g. Global System for Mobile communications or GSM, CDMA (Code Division Multiple Access) and TDMA (Time Division Multiple Access), 2.5 generation ("2.5G", e.g. General Packet Radio Services or GPRS) and $3^{rd}$ generation (3G) cellular technologies such as UMTS (Universal Mobile Telephone System) and 1×RTT (1×) radio transmission technology).

The present invention also relates to messaging, both immediate messaging and voice messaging. Immediate messaging is a relatively new concept, originally suggested by the ICQ Corp. The invention further relates to Instant Messaging and Presence Services (IMPS) and to Push-to-Talk (PTT) voice over Internet protocol (IP) telephony (PTT over VoIP), also called immediate or instant voice communication (IVC).

BACKGROUND OF THE INVENTION

Existing IVC Technologies

Several technologies enable immediate voice communication. Though telephony voice communication can be easily established via a circuit switched line such as a telephony connection, it still has its delays (e.g. connection delay), which do not exist in PTT technologies such as iDEN (integrated Digital Enhanced Network) or TETRA (Terrestrial Trunked Radio).

First introduced in 1994, iDEN is being used in the cellular telephony communication field. Its installation base is very low in comparison to that of other cellular technologies. In iDEN, a user can push a button and speak into his handset while his designated group receives his spoken words immediately. iDEN thus resembles a radio 'walkie-talkie' technology. The target audience can immediately reply, also very similar to a 'walkie-talkie' system.

TETRA is an open standard for a single, cohesive two-way radio network supporting multiple government agencies throughout the country that communicate together on the same network. etc.), and has a small installed base within the consumer sector.

Other IVC technologies include "Private Mobile Radio", which is a short-range radio service with limited capabilities that is mainly used by work groups, and "Walkie Talkie Terminals" such as 'Cobra' and 'Talkabout', which represent a growing market in the consumer segment (theme parks, ski resorts, etc.), but have a limited transmission range.

PTT technologies have a small installed base within the cellular market in comparison with other popular cellular technologies such as GSM, CDMA, and TDMA.

Recently, an emerging 'always-on' concept for data networks has been developed. In this concept, a user is always connected with his/her cellular handset to a data network. This can be seen in the GPRS cellular technology where an IP network is added to a GSM cellular voice network. This permanent data connectivity has developed a lot of hope for IVC over a large installed base of cellular users.

VoIP can transmit voice over data networks and as such it is expected to become a key technology for the IVC concept over data networks. However, such a VoIP implementation requires modification of the end-user's handset in order to enable this handset to support encoding and decoding of voice over the IP network. Such a modification can be called 'client software'.

Existing Immediate Messaging Solutions

ICQ is a widely used immediate messaging technology, started as an Internet-based (and thus data-based) technology. The ICQ technology enables people to communicate by text messages that are immediately forwarded over the Internet. One can attach a voice file to an ICQ message, but the technology is not voice-based and voice is only an attachment. Though ICQ is implemented over advanced cellular networks such as the GPRS network, it uses the data part and not the voice part of the cellular network. The ICQ technology requires 'client software' to be installed on the end-user devices. Other ICQ-like technologies exist, for example 'AOL messenger'.

Short messaging services (SMS) represent another immediate messaging platform that enables immediate text messages with up to 160 characters to be transmitted over a signaling sub-network of a telephony (especially cellular) system. EMS (Enhanced SMS) is a technology that enables concatenation of short SMS messages, thus enabling transmission of images or pictures.

Another immediate voice messaging method can be seen as a multi media service (MMS)-based 'record and send' service. In this service, a user records his message in his MMS supporting handset, then sends the message to another MMS 'record and send' supporting handset. The message is stored within the target user's handset and can be played. This service requires an MMS supporting network as well as dedicated handsets, and requires a lot of interoperability efforts in order to run among various networks and handsets.

Another immediate voice messaging method is voice paging (VP). VP is based on calling a certain phone number and then entering a subscriber identification number (IDN) followed by relaying of the voice message. The message is sent to a voice-paging device.

The appearance of 2.5G cellular technologies such as GPRS enable immediate messages to be transmitted over an always-connected data network. SMS messages can be similarly transmitted.

Recent efforts at standardizing the instant communication or instant messaging technologies include the 'Wireless Village' Forum founded by Ericsson, Motorola and Nokia in April 2001 to define and promote a set of universal specifications for mobile instant messaging and presence services. The Wireless-Village proposes a standard protocol for instant messaging and presence service (IPMS), which includes presence information management, instant messaging, group management and shared content. Another forum is PAM—the Presence and Availability Management forum. The PAM forum is an independent, non-profit consortium established to standardize the management and sharing of presence and availability information across multiple services and networks. The IETF (Internet Engineering Task Force) has a group that deals with the Instant Messaging and Presence Protocol (IMPP). The IMPP group is working on protocols and data formats necessary to build an Internet-scale end-user presence awareness, notification and instant messaging system. The most recently established group (Oct. 31, 2002) is the Extensible Messaging and Presence Protocol (XMPP) working group within the IETF.

Existing Voice-Mail Technologies

Leaving voice messages over a telecommunication network is a common behavior supported by voice-mail systems. These forward a call to a voice-mail answering machine that enables the calling user to leave a voice message. Voice-mail systems are built to different capacity and sizes: systems for telecommunication carriers, for medium size organizations or even for private customers (an answering machine at home). These systems enable the calling user to leave a message in case the called party does not answer, in case the called number is busy, or even in case of call waiting. It is also possible to leave a message in case the called party is a cellular client within an area without proper radio coverage. Another way for leaving a voice message is by dialing directly to the voice-mail system (without calling the target user), including the target user's phone number. Thus, dialing for example 151-54-123456 will enable leaving a voice and/or fax message to subscriber No. 054 123456 without even calling him/her.

When a voice (and/or a fax) message is left for a target customer, the customer can find out about this event either by getting an SMS notification; by getting a small icon e.g. ✉ that will be displayed on his/her handset display; or by simply lighting an indicator on his/her phone (which can be a wire-line phone connected to a wire-line telecom network or a PBX (private exchange)).

Another way to find out whether new voice-mails have arrived to one's voice-mailbox is simply by calling the voice-mail system and hearing how many new messages are waiting. Message retrieval is done by calling the voice-mail system, hearing the interactive voice reply (IVR) and following the instructions of the IVR.

Voice-mail technologies are common. Comverse (29 HaBarzel Street, Ramat Hachayal, Tel Aviv 69710, Israel) has developed and leads the market with voice-mail technology. Voice-mail technologies can use SS7 signaling system interconnections in order to be connected to the telephony system. Other voice-mail systems are implemented over data networks. These voice-mail systems use VoIP technologies in order to receive and send voice to the data networks that these voice-mail systems are connected to.

Some voice-mail systems (such as Comverse's) enable the user who leaves a message to mark this message as "urgent". In such cases, all urgent messages will be played to the target user before the 'regular' messages (those that have not been market urgent). The playing order of the urgent messages is according to the chronological time they were left.

Existing VoIP Implementations for Instant Voice Communication

In prior art, there are a few attempts made to implement instant voice communication over data networks. These implementations try to emulate the usage experience of 'push to talk' technologies. For example, Mobile Tornado (6 Galgaley Haplada Street, P.O. Box 4043, Herzlya 46140, Israel) uses cellular data networks (e.g. GPRS, 1×RTT, etc.), which have the feature of being always connected to the end-user. Thus, the user is always connected to the network and therefore is always available to receive a message in a very short time. Because the networks mentioned above are built for data transmission, voice can be transmitted over such networks only as VoIP. VoIP requires a special network installation, special handsets, special interoperability issues, therefore time to market is much longer, the number of users that can use this system is lower and there are many interoperability open issues. Also, VoIP networks suffer from a low quality of service (QoS) because of typical characteristics of VoIP systems such as jitter (variable delay), delay, bandwidth problems etc.

Disadvantages of Existing Solutions

Existing solutions do not provide instant voice messaging with almost real time experience of voice communication for ALL telephony systems and technologies—both wire-line and cellular. Most existing solutions require client software on the end-user terminal. Most existing solutions have a limited installed base such as iDEN technology or TETRA technology.

Existing VoIP solutions for instant voice communications over 2.5G cellular data networks such as GPRS data network have a lower voice quality than circuit switched voice networks. This is mainly because of the improved voice quality that circuit switched voice networks can provide. Circuit switched voice networks are dedicated telephony connections, wherein data networks are packet-based. A VoIP technology is required when packed based networks (data networks) are used to transmit voice, and the quality of the transmitted voice is lower than the quality of voice transmitted over a circuit switched network Existing methods for retrieval of voice and/or fax messages require a user to call the system, listen to system greetings and new messages that were received prior to the desired message, then finally retrieve the desired message.

Existing PTT technologies do not necessary provide a "store and forward" engine. In other words, a message that was not heard is actually lost, similar to the situation in two-way radio communication. A lack of store and forward engine makes PTT intrusive, i.e. a handset may suddenly begin to make an intrusive noise when playing an incoming voice message. iDEN for example does not allow storing a sent message. Therefore, if the targeted user is not listening, the message would be lost. Furthermore, no indication that a message tried to reach a target user will be provided to the target user. Also, no indication for reception or non-reception is provided to the initiating user.

A major disadvantage of existing message retrieval methods is that the target user cannot reach and retrieve a specific message without hearing all previous messages. Furthermore, even in case that the target user is notified of an expected voice (and/or a fax) message that is very important and/or urgent, the target user still has to call his/her voice-mail system and hear all the previous messages. Another disadvantage of known voice-mail retrieval methods is the need to listen to the greetings part and the operational instructions of the IVR. One recently introduced method that enables instant voice-mail retrieval is provided by Comverse and called 'visual voice-mail'. This method requires a dedicated 'client software' or a dedicated handset as well as an additional communication link (e.g. IP based session) with the voice-mail system. In fact, according to this method, the end-user can have a browsing session with the voice-mail in which the user will find out what messages were left for him/her, and then can choose a message to be played. The message will be played as requested. This method definitely requires a special end-user device as well as an IP-based session with the voice-mail server.

U.S. Patent Application No. 20020146097 discloses a method, apparatus and system for short voice message (SVM), which is sent as a SMS message, a SMS-like message, or as an instant message. The method of operation suggested by the patent application includes one of the following: using the MMS protocol on new user terminals and networks; utilizing existing SMS point-to-point service by concatenating packet data unit (PDU) strung together to form a short voice message; applying a voice to text converter on the recorded message and a text to voice converter as the message is played; or by sending the voice message on data networks.

Canadian Patent No. 2355420 describes an apparatus and method for transmission of information over an electronic network in the form of a user-to-user voice messaging service between mobile phone subscribers. In a preferred embodiment of the invention, the system is provided as a voice SMS platform, comprising a voice SMS server and an application user interface layer coupled with a Graphic User Interface (GUI). The invention may be applicable based on of the following technologies: browser-based interface based on Wireless Application Protocol (WAP) or HTML or C-HTML; SIM Application ToolKit (SAT); and Interactive Voice Response (IVR).

U.S. Patent Application No. 20020146097 and Canadian Patent No. 2355420 do not disclose solutions that may be implemented with existing standard network and end-user equipment, allowing the full end-user flexibility and real-time usability.

There is therefore a widely recognized need for, and it would be highly advantageous to have methods and systems for instant voice messaging and voice message retrieval that do not exist in prior art.

SUMMARY OF THE INVENTION

The present invention discloses novel instant (immediate) voice-messaging (IVM) methods and systems. Some of the IVM methods disclosed herein provide acknowledgments for message reception or non-reception. The IVM methods disclosed herein differ from prior art instant voice communication methods (such as the PPT method) in that they can be easily implemented over all cellular networks as well as wireline telephony networks and all existing end-user telephony devices.

According to the present invention there is provided in a communications network, a system for instant voice messaging comprising an IVM server (described in detail below) operative to essentially simultaneously receive from an initiating user at least one voice message fragment and to stream the at least one voice fragment to at least one target user; and a switch coupled to the IVM server and operative to effect communications between the initiating user and each target user and the IVM server, as well as between the initiating and at least one target users; whereby each voice message originating from the initiating user may be instantly transmitted over the communications network to the at least one target user.

According to the present invention there is provided a method for relaying an instant voice message from an initiating user to at least one target user over a communications network, comprising the steps of: at an IVM server, receiving at least one voice message fragment from the initiating user, and essentially simultaneously with the step of receiving, streaming the at least one voice fragment to the at least one target user.

According to the present invention there is provided a method for instant retrieval of a voice message sent from an initiating user to a target user through an IVM server, comprising the steps of: by the target user, receiving a smart notification from the IVM server that a particular instant voice message has been sent to him/her; and by the target user, directly accessing the particular message.

According to the present invention there is provided an instant voice messaging (IVM) server comprising a mechanism for receiving at least one voice message fragment from a first user and for essentially simultaneously streaming the at least one voice message fragment to at least one second user, and a communication mechanism for the IVM server to communicate with the first user and the at least one second user.

The present invention discloses systems and methods for sending instant voice, fax and multimedia messages through existing standard cellular and PSTN networks and standard end-user terminal technology. A message is preferably sent to the end-users using a "push" method of operation and using a streaming technology that allows users to start listening to the message while it is still being recorded, and to retrieve recorded messages using a single function (e.g. a button on a handset). Users may also easily switch to a full bidirectional (full-duplex) conventional phone conversation.

The present invention also provides an improvement of voice paging (VP) by enabling VP integration with the instant voice messaging service disclosed herein. This enables the IVM service to be extended to voice paging devices. A telephony user will simply have to store a telephone number that includes: (a) an instant messaging server number followed by (b) a voice paging server number followed by (c) a target user paging identification number. When this telephone number is dialed, the IVM server will connect to the voice-paging server, yielding an intuitive and simple instant voice paging service with a possibility to initiate it from a regular telephony device.

The present invention enables sending PTT messages to telephone users who do not have a PTT phone, or who are not subscribers of a PTT service. This can be done by sending a PTT message to the IVM server, which converts this message into an IVM message and sends it to any telephony user. Furthermore, this invention enables each telephony user to send an IVM message to the IVM server, which converts this message into a PTT format and sends it to a PTT system. The PTT system then delivers this PTT message to any PTT user specified by the telephony user.

The present invention discloses a special numbering feature (method) that enables instant access to the IVM server, enabling the implementation of this service over existing telephony networks, in particular networks using the SS7 signaling system. This feature enables to create an instant voice message, while simultaneously initiating a voice session with the target user(s). For example, dialing "152" and after that dialing a telephone number of a target user, e.g. 152-054-123456, will start an instant session with the IVM server which in turn will simultaneously start an IVM session with the 054 123456 telephone user. In this example "152" is a special "IVM prefix" that indicates to the switch that the session is an IVM session and therefore should be forwarded to the IVM server.

The voice session with the target user(s) will preferably include a special notification for the target user(s) that lets the target user(s) know that the session includes an instant voice messaging communication. The IVM server enables the initiating user to create his/her message while the target user(s) can already begin hearing the message. The initiating user can be notified whether his/her message is being heard during its creation by insertion of a special notification (e.g. "beep") into the voice session that the initiating user has with the IVM server. Alternatively, the initiating user can be also notified that his/her message was heard a little while after the initiating user has finished his/her voice session with the IVM server. This notification can be done either by a SMS or by a message that can be created by the IVM server and sent to the initiating user. The initiating user and the target user may be both connected to the IVM server, but do not normally have a telephony, two-way communication channel between them, although such a channel can be easily established. Thus, the IVM service is a content-based call-teaser or content-based call-screening service, i.e. a phone call can be established (call-teasing) or not (call-screening) depending on the content of a certain message. Nevertheless, the IVM service enables the initiating user to choose in advance (by using different dial numbers) whether he/she is sending an instant voice message or whether he/she would rather have a conversation with the target user. The innovative numbering method disclosed herein enables the users (both initiating and target) to choose whether to use a messaging mode or a conversation mode right from the initiation of the session, as there are different numbers for a conversation session and a messaging session. The instant voice messages can be limited in duration (e.g. a limitation of being no longer then 2 minutes, etc.).

The method and system described herein also provides an add-hoc, one-to-many conference call establishment. The process may begin with an instant voice message of one-to-many users saying for example "please join me in a conference", and will continue as a conference call. Sending a short message to many users saying "please join me to a conference call" will enable target users to press a key on their phone and join a regular conversation with the initiating user.

The present invention further discloses a method and system for instant retrieval of regular voice and/or fax and/or instant voice messages. The system enables direct access to a specific voice and/or fax and/or multi-media and/or unified message, without the need to listen to previous messages and/or to system greetings and/or to system operational instructions. After the user is notified that a certain message has been left for him/her, e.g. by a SMS notification that states: "you have a new voice (and/or fax) message from phone No.: +972 3 123456", the user can call a voice-mail system described herein while using the information received with the notification (in this case the number +972 3 123456). In order for the retrieval to be "instant", the notification needs to be "smart", for example a SMS with a "smart" Caller ID, e.g. 153 972 3 123456 1997. In this example, "153" is a prefix, which, when dialed, will tell the switch that this is an instant retrieval of an instant voice message. Therefore, the switch will forward this call to the IVM server, but with one difference to the "152" prefix in the accessing of the server above. "152" reflects a message creation session, while "153" reflects a message retrieval session. The IVM server will treat a call with a 153 prefix as a retrieval call. "1997" is an example of a suffix that can specify the particular message to be instantly retrieved. A combination of an initiating user number with the suffix can allow a shorter suffix, because in such case the suffix will have to specify only the messages left by that particular initiating user, and not all messages left within the system.

An exemplary text (content) of the SMS may be as follows: "you have an instant voice message from 972 3 123456; in order to retrieve it instantly, please dial the number of this message sender". The user can then simply use the number within the SMS by pressing the CALL or SEND button on his/her handset.

The methods and systems for instant retrieval of regular voice, fax and instant voice messages also enable direct and instant access to an unheard (un-listened to) instant voice message that has become a voice-mail message. This may be done as follows: when the IVM message is transferred from the IVM server to another storage e.g. a voice-mail, the IVM server can communicate with the other storage (in this case the voice-mail) server and get a special pointer for instantly accessing that message within the new storage. The receiving (target) user does not have to know whether the message has been transferred to another storage or not. The user simply uses the numbering method for instant access to a message stored within the IVM server. In case the message has been transferred, the IVM server can still access it and play it instantly. Alternatively, every message stored within conventional storage systems such as voice-mail, may get an instant access pointer, and a smart notification as described above may be sent to the receiving user, enabling him/her to instantly retrieve that message, without using the IVM server.

The present invention is suitable for implementation with all cellular technologies as well as with wire-line telephony technologies. In contrast with existing methods, the present invention uses preferably circuit switched networks for its instant voice messaging service, thereby providing a high quality of the transmitted voice.

BRIEF DESCRIPTION OF THE DRAWINGS

Reference will be made in detail to preferred embodiments of the invention, examples of which may be illustrated in the accompanying figures. The figures are intended to be illustrative, not limiting. Although the invention is generally described in the context of these preferred embodiments, it should be understood that it is not intended to limit the spirit and scope of the invention to these particular embodiments. The structure, operation, and advantages of the present preferred embodiment of the invention will become further apparent upon consideration of the following description, taken in conjunction with the accompanying figures, wherein:

FIG. 1b shows an exemplary individual IVM number;

FIG. 1c shows an exemplary multiple target user IVM number;

FIG. 2b shows details of the steps in the flow chart of FIG. 2a;

FIG. 8 shows yet another embodiment of the IVM system of the present invention, in which the IVM server is connected to a legacy PTT system and/or VoIP based PTT system.

DETAILED DESCRIPTION OF THE PREFERRED EMBODIMENTS

The present invention discloses methods and systems for instant voice messaging and voice message retrieval.

Figure 1A:
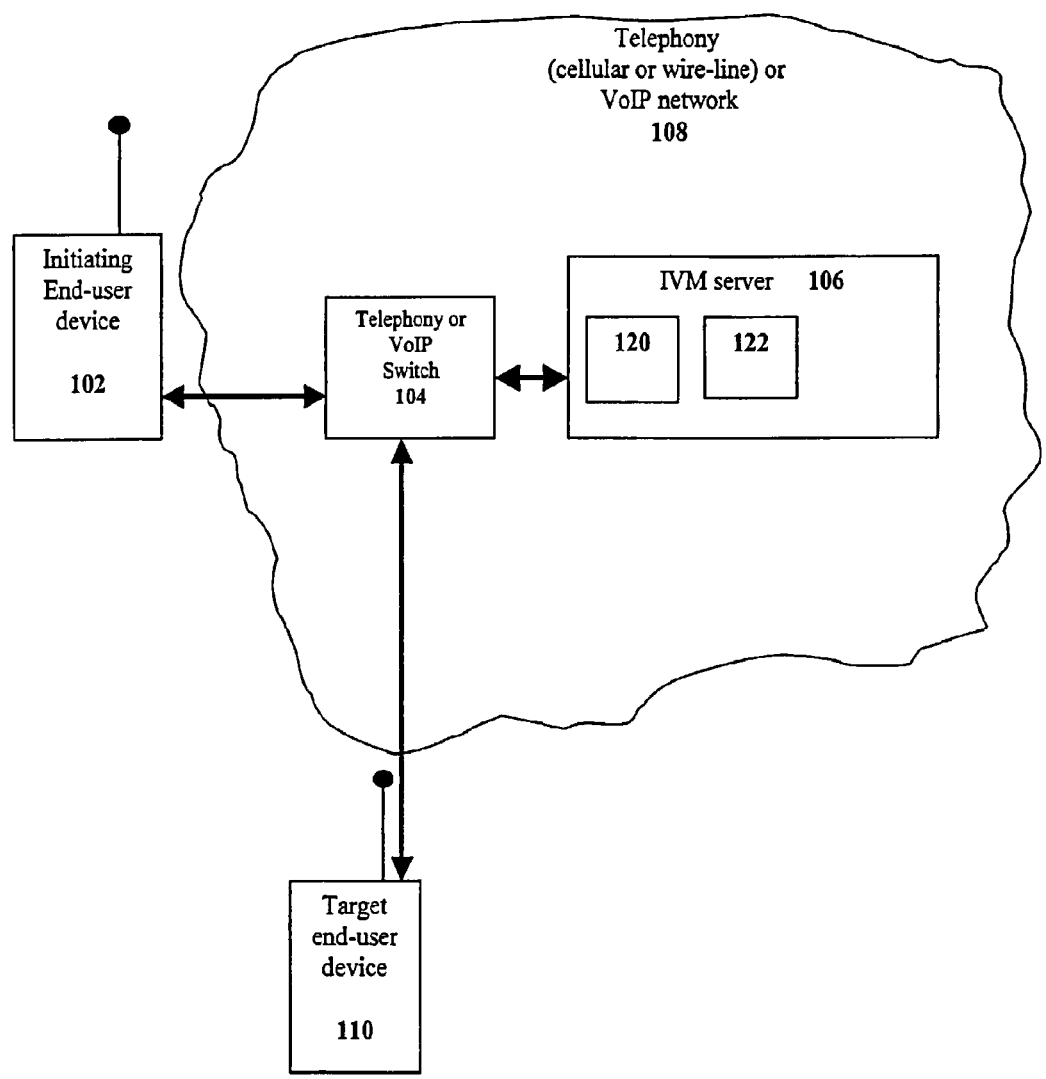
FIG. 1a shows a schematic block diagram of a basic preferred embodiment of an instant voice messaging (IVM) system according to the present invention.

FIG. 1*a* shows a schematic block diagram of a basic preferred embodiment of an instant voice messaging system 100 according to the present invention. The system comprises an initiating end-user device ("initiating user") 102 coupled through a telephony or VoIP switch 104 to an instant voice messaging (IVM) server 106 installed in a telephony (cellular or wire-line) or VoIP network 108. The initiating user may be connected through switch 104 to one or more target end-user devices ("target users") 110. The discussion will continue with reference to one target user, with the understanding that the invention applies equally well to a plurality of such users. The initiating and target end-user devices may be a cellular handset (either analog and/or digital 2G, 2.5G or 3G), a wire-line telephone set or a VoIP set, and may have an optional memory that can store numbers. Hereinafter, all such devices will be referred to simply as "handsets". Each user is assigned an instant voice-messaging number, described in more detail below. This represents a first major innovative feature of the present invention. Dialing the IVM number of a target user will instantly set up (initiate) a session with IVM server 106, which will enable the initiating user to create an instant voice message. Essentially simultaneously, server 106 initiates a session with one or more target user. Uniquely and inventively, parts (fragments) of the message already created by the initiating user are then transmitted (streamed) by the IVM server to the target user while the initiating user still creates other fragments, in contrast with all known existing voice message techniques.

A first main enabling feature that facilitates the simultaneous creation of an IVM by the initiating user and the initiation of a session between the IVM server and a target user is the unique and inventive IVM numbering system disclosed herein below. A second main feature enabling simultaneous message fragment storage and streaming to a target user is a "fragment storage and streaming" module 120 preferably included in IVM server 106. Module 120 is operative to recognize the format of the received message and to start saving the message in a given format, for example MP3. The module is further operative to save the message in fragments of a given size, and to stream (forward) these segments to the target user even before the entire message has been received by the IVM server.

System 100 may comprise an optional "instant retrieval" module 122 preferably (but not necessarily) included in server 106. When included, module 122 is operative to provide a "smart" notification (e.g. a "smart" Caller ID or SMS) to the target user. This notification may be used by the target user if the "push" operation failed, or in the case he/she accesses an already heard and previously saved. This notification provides the target user with instant access to the saved message. In the context of the present invention, "smart" means a numbering system that allows instant retrieval of the specific message. System 100 may optionally further comprise a presence status module 326 preferably included in the IVM server and operative to provide the status of the target user, as described in more detail below.

Module 122 creates a way for identification of stored messages by pointing out these messages so that they will be instantly retrieved. Furthermore, this module creates the smart notification. The IVM server does not necessarily have to store IVM messages. For example, in case that the target user has heard the message during its preparation and did not ask to save it or forward it etc., the message can be simply discarded. In this case, the IVM server performs only a buffering activity instead of a storage activity. Furthermore, an operator can define that an IVM messages should not be stored but only buffered, and heard only in case it was heard during its preparation.

FIG. 1*b* shows an exemplary individual IVM number (for a session between an initiating user and a single target user). FIG. 1*c* shows an exemplary multiple target user IVM number (for a session between an initiating user and a plurality of target users). When the initiating user dials the number, the switch recognizes this as a call to be forwarded to the IVM server. Furthermore, the IVM server recognizes this as an instant voice message to be "pushed" (sent instantly, even before the message is completed, i.e. completely recorded at the server to a target user with a telephone number included in the IVM number. An individual IVM number may include either two or three parts. A two part IVM number includes an IVM prefix 152 and a target user number 154, for example 152 054 123456, where "152" is the prefix, and 054-123456 is the target user number. As usually done with telephony networks, the zero (0) at the start of the number can be omitted when a prefix is added. Therefore, target user number 154 can also look like 54123456. In general, if it includes three parts 152 (IVM prefix), 154 (target user number) and 156 (IVM suffix, e.g. "789")) as shown in FIG. 1*b*, either prefix or suffix may suffice to identify the session as an IVM session. That is, the telephony or VoIP switch can use either the prefix or the suffix as notification to forward this message to the IVM server. Part 154 allows the IVM server to instantly 'ask' the telephony or VoIP switch to connect to the target number. The target user's IVM number can be immediately accessed and the session can be immediately initiated. "152", "154" and "156" can be also numbers that represent IP address and have the format of an IP address (e.g. "152" can look like 172.24.204.205).

Table 1 shows exemplary entries into a phone memory. The stored numbers are IVM numbers having a prefix "152". The dialing of each number will send an IVM to the user having the number following the prefix.

TABLE 1

| Instant Voice Message - Mum | 152 054 123456 |
|---|---|
| Instant Voice Message - Dad | 152 054 654321 |
| IMVM Sharon | 152 053 334455 |
| IMVM Dana | 152 053 576632 |

When there is a plurality (or "group") of target users, the multiple target user IVM number also has preferably three parts, as shown in FIG. 1*c*. In other words, a multiple target user IVM number includes an IVM session identifier, a multiple target user identifier, and a telephone number or IP address (e.g. in Internet based systems) of each target user. A first part 160 "informs" the telephony or VoIP switch that the initiated session is an IVM session. A second part 162 informs the IVM server that this is a request for an IVM session between an initiating user and a plurality of target users. A third part 164 includes all the telephone numbers of the group of target users. All telephone numbers of all target users can be entered directly one after another or separated by an agreed sign.

As indicated in FIG. 1*c*, an exemplary multiple target user IVM number may look like 152 * 054 123456 #054 765432 #053 234876, where "152" (part 160) stands for "initiating IVM session". "*" (part 162) stands for a session with a plurality of end-users, and "#" stands for separation between various group member telephone numbers (the three numbers 054 123456, 054 765432 and 053 234876 forming here part 164). The entire multiple target user IVM number may be saved in the initiating user device under a given name such as "IVM to my class mates". Furthermore, groups of users can be defined by dialing 152 to the IVM server and then keying in a certain code, e.g. 777. They will get an IVR (interactive voice response) that will guide them to enter the group members' numbers. Following, such a group will get a group identification number, e.g. "54321", and then an IVM message could be left to the whole group by simply dialing e.g. 152 54321. It is also always possible to access the IVM server via the Internet (WEB interface) and define user groups.

The IVM server is involved in, and is the conduit for all communications between the initiating user and the target end-user(s) during an IVM session. However, any user (target or initiating) may ask the IVM server to change the mode of communication from an IVM session into a two-way telephone call (for two participants) or into a conference call (for more than two participants). In such a case, the initiating user a can press some agreed keys (e.g. pressing ##) and the IVM server will signal the telephony or VoIP switch to initiate the two-way or conference call.

The IVM server can have recorded messages that can be played to all users connected to it, at various times during their connection. Such messages can instruct initiating and target users with regard to various functions that can be performed, such as setting up a regular voice telephone conversation by keying in certain keys, etc.

The IVM server may include a function of limiting the instant voice-message length. In order to eliminate the possibility of telephony network overload by instant voice-messages that are too long, the IVM server may stop the creation of an IVM after a limiting duration (e.g. 2 minutes). A notification can then be sent to the initiating user to create a message no longer than the given limiting duration.

Figure 2A:
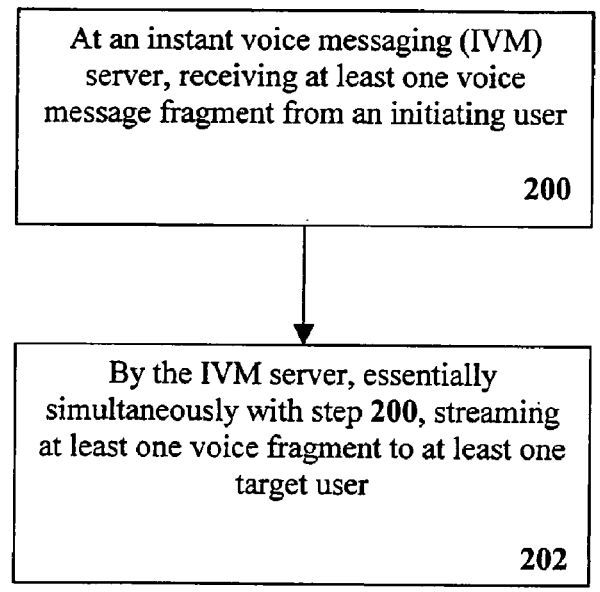
FIG. 2a shows an exemplary flow chart that illustrates the main steps in a preferred embodiment of the method for IVM according to the present invention that performs an IVM "push" function.

FIG. 2*a* shows an exemplary flow chart that illustrates the two main steps in a preferred embodiment of the method for instant voice messaging according to the present invention that performs an IVM "push" function. These include receiving at least one voice message fragment from an initiating user at the IVM server in step 200, and essentially simultaneously with the step of receiving, streaming the at least one voice fragment to at least one target user in step 202. These steps are now described in more detail in FIG. 2*b*.

As shown in FIG. 2*b*, step 200 further includes the following: a typical IVM "push" procedure starts with the initiating user providing the IVM number of a target user to the IVM server (i.e. establishing a signaling session) through the switch in step 210. The IVM server is accessed by the initiating user (i.e. a voice session is established) using this number in step 212. After being accessed, the IVM server preferably sends a notification signal e.g. a beep to the initiating user, indicating to the initiating user that he/she can begin recording the message. In step 214, two processes occur in parallel: the IVM server starts to record the message provided by the initiating user (using fragment storage and streaming module 120) and essentially simultaneously accesses the target user. The IVM server continues to record and store the message fragments until the entire message is transmitted by the initiating user.

As further shown in FIG. 2*b*, step 202 further includes the following: The target user may or may not answer the IVM server after being accesses by it. If the target user does answer, the IVM server streams the already stored fragments until the entire message is transmitted in step 216. The target user may at any streaming stage move to a full-duplex session with the initiating user (step 218). In addition, in case the target user has answered the incoming IVM message, the initiating user can at any time, press a certain key on his handset and change the IVM session into two-way phone conversation. Either user can notify the server that he/she would like to have a full-duplex session with the other party. This can be notified by e.g. a DTMF (Dual-Tone Multi-Frequency) signal that was created by pressing on any key on the handset. Also, other notifications are possible, e.g. in IP telephony any command based on a data code that can be generated within the end-user handset. Upon getting the notification, the IVM server connects the involved users to a full-duplex session through the server, or commands the telephony (or VoIP) switch to connect these users to a full-duplex session directly through the switch.

Alternatively, the target user may further process the message, e.g. by saving it, replying to it or forwarding it, as described in more detail with reference to steps 248-258 of FIG. 2*c*. If the target user does not answer the server (step 215) the server may further process the message according to predetermined rules. This processing may include for example storage within the IVM server, transfer to a voice-mail system, or attempts to resend the IVM message. For example, if the message is still stored within the IVM server, the message is played instantly. If the message is not stored, then the IVM server either contacts the voice-mail system and performs a smart retrieval (in which case the message is played instantly), or does not do anything "smart" and just connects the retrieving user to the voice-mail system (in which case there's a regular message retrieval). Alternatively, a user can always access his/her voice-mail and try to retrieve any existing messages there. If the message spoken is within the voice-mail system, the user will simply hear it.

Figure 2C:
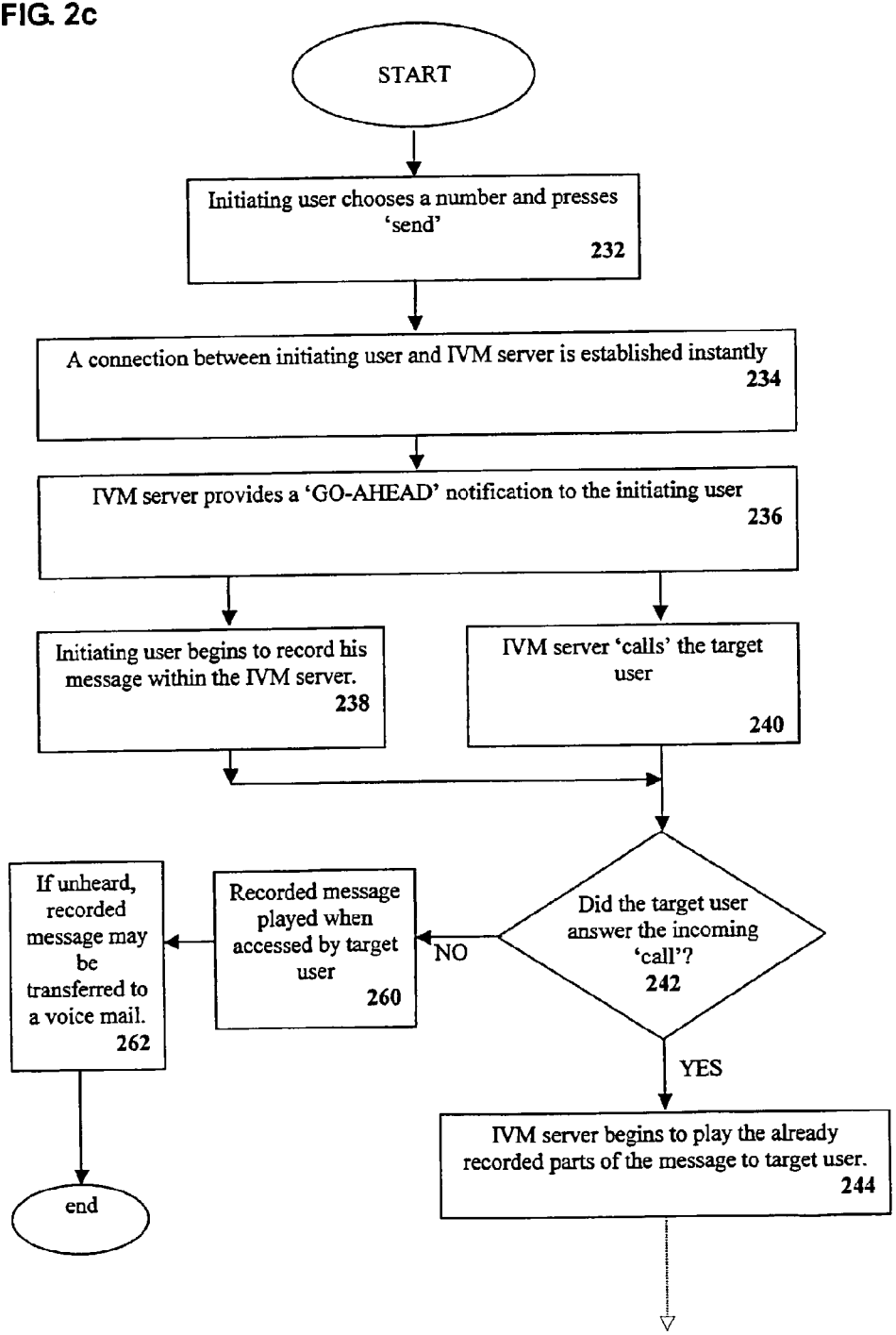
FIG. 2c shows alternative additional steps of processing the IVM sent in FIG. 2b.

FIG. 2*c* shows a more detailed flow chart of an exemplary IVM process according to the present invention. After a process start, an initiating user chooses (or "keys in") a number and preferably presses a "send" function on his/her handset in step 232. A connection between the initiating user and the IVM server is established instantly in step 234. The IVM server provides an acknowledgement (e.g. a "go-ahead" notification) to the initiating user in step 236. Two steps (identical with 212/222) then follow essentially simultaneously: the initiating user begins to record his message within the IVM server in step 238, while the IVM server calls the target user in step 240. A check to see if the target user answered the incoming call is run in step 242. If it did ("yes"), the IVM server starts playing the already recorded parts (fragments) of the message to the target user in step 244. The target user can then choose, by preferably pressing a DTMF key on his/her handset, one of six optional actions in step 246: save the message in step 248, or; reply with an instant voice message in step 250, or; in step 256, reply to all users, i.e. the initiating user and all target users, in case there are more than one target users, or; forward the message as an IVM to another user in step 252, or; establish a full-duplex phone conversation with the initiating user in an instant way in step 254, or; delete the message in step 258. Alternatively, the target user may just end the session.

If the target user did not answer the call ("No" in step 242), the recorded message is played when accessed by the target user in step 260, or, if not accessed for a given period of time, the recorded message may be transferred to a voice-mail in step 262, and the process ends.

Figure 2D:
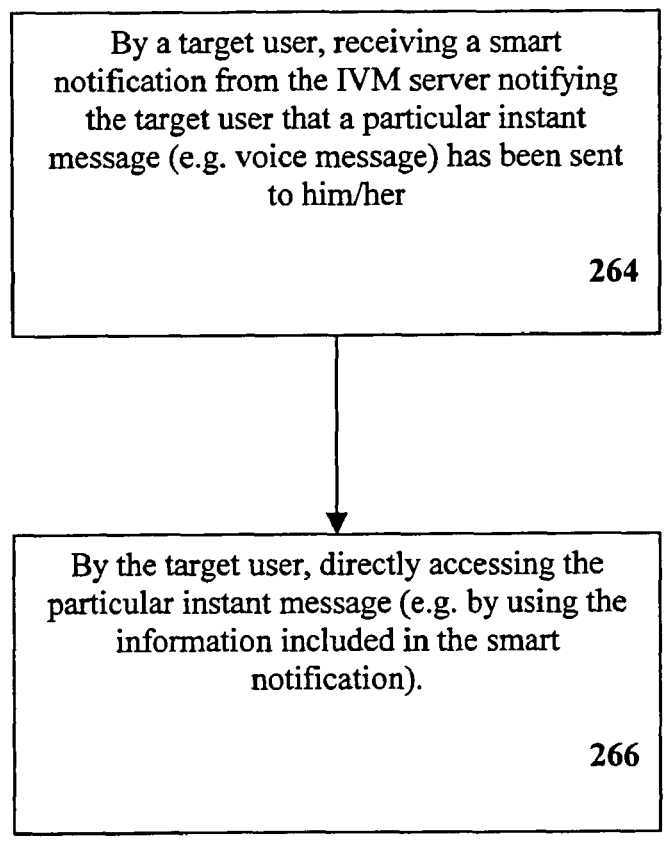
FIG. 2d shows an exemplary flow chart that illustrates the main steps in a preferred embodiment of the method for instant voice messaging according to the present invention that performs an IVM instant retrieval function.
Figure 2E:
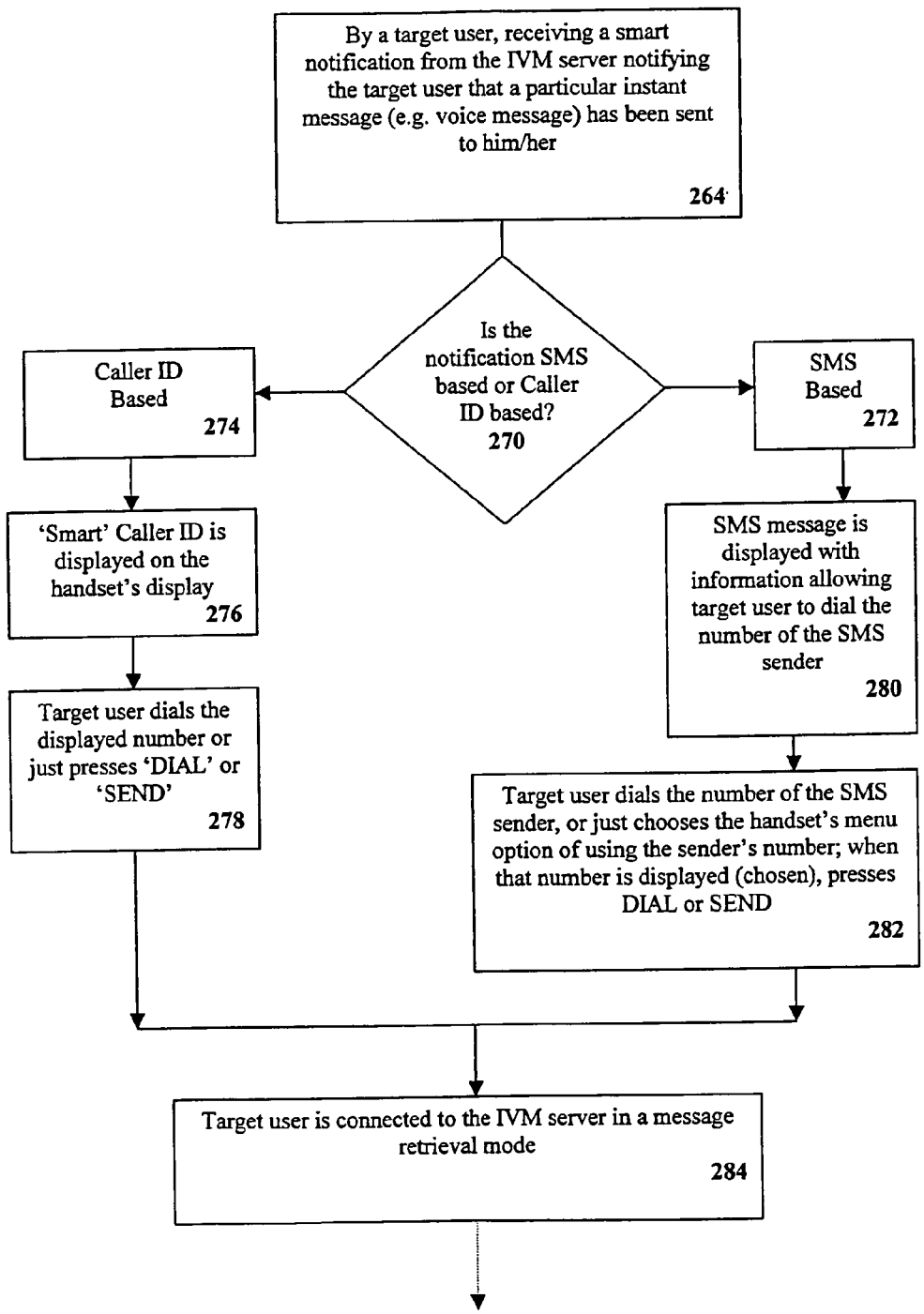
FIG. 2e shows details of the steps in the flow chart of FIG. 2d.
Figure 2E:
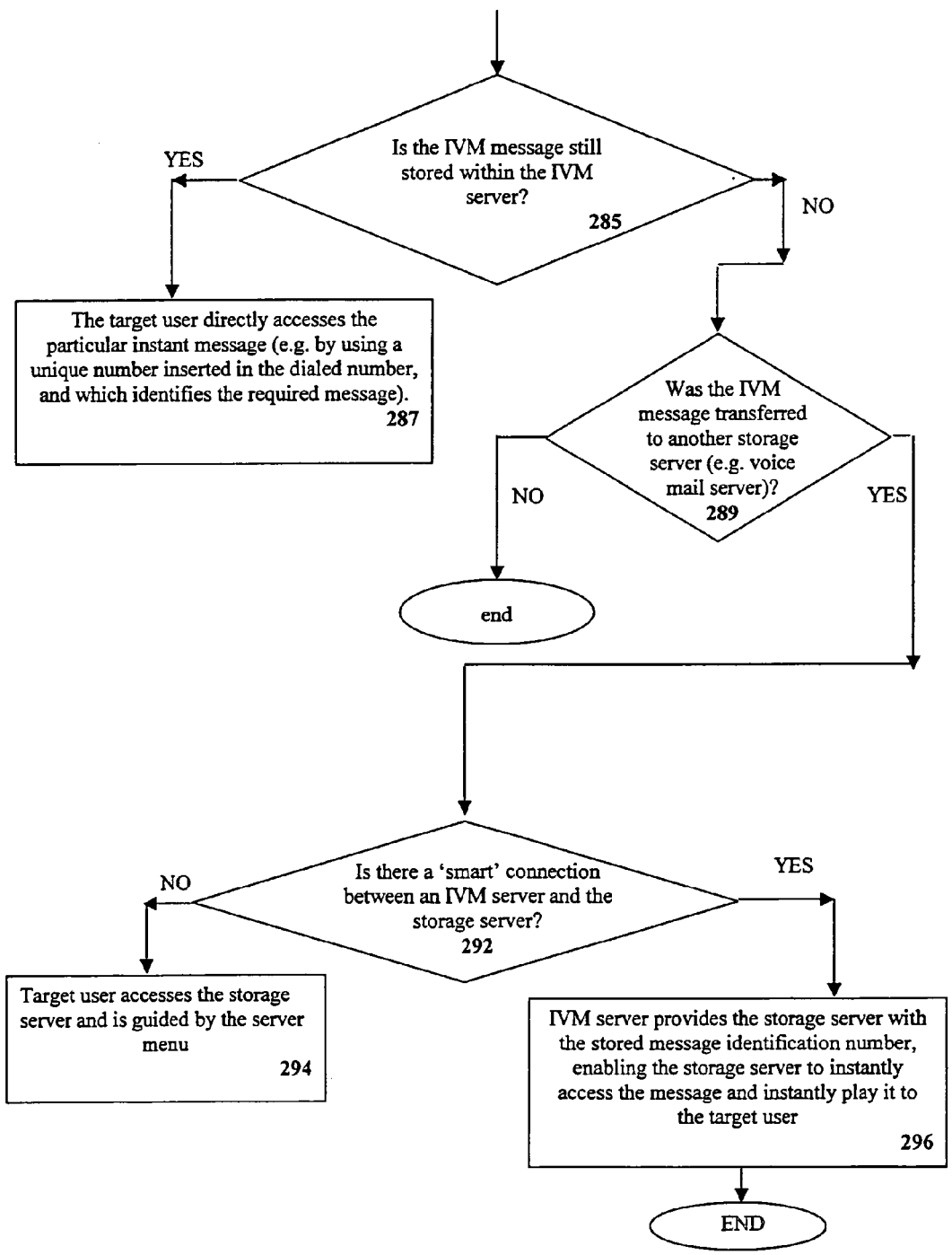

FIG. 2d shows an exemplary flow chart that illustrates the two main steps in a preferred embodiment of the method for instant voice messaging according to the present invention that performs an IVM instant retrieval function. These include receiving, by a target user, a "smart" notification from the IVM server that an instant message (voice, fax, etc.) has been sent to him/her in step 264, and directly accessing the particular instant message in step 266. These steps are now described in more detail in FIG. 2e.

Prior to step 264, the IVM server sends the target user the "smart" notification, which may be for example a "CALLER ID" saying: "an instant voice message from ABC#XYZ*W054 123456". Here "ABC" stands for the access code to an IVM instant retrieval module located either in the IVM server (i.e. module 122) or in any other system capable of storing messages. "#XYZ" stands for a unique identification code for the specified message, and "*W" stands for the message type (voice-mail, MMS message, unified message or IVM). For example W=1 means a voice-mail message, W=2 means an MMS message, W=3 means a unified message and W=4 means an instant voice message. In case the target user did not see the caller ID and missed (did not answer) the incoming IVM message, the target user who sees the 'missed instant voice messages' notification may read the list of the missed (unanswered) instant voice messages including the prefixes (step 276), and may dial manually the prefix of a particular message in order to instantly retrieve it (step 278). In step 278, the target user may also just press the 'DIAL' or 'CALL' button on the handset, while looking at a certain 'missed' message notification. In this case the handset will automatically dial the prefix.

Alternatively, the notification may be an SMS message, as described in more detail below. The target user checks if the notification is a Caller ID or an SMS message in step 270. If an SMS message (step 272) the target user reads the message in step 280, accesses the number of the SMS sender in step 282 as indicated and is promptly connected to the IVM server in a message retrieval mode in step 284. If a Caller ID notification (step 274), the Caller ID is displayed on the target user's handset display in step 276, and the target user accesses the displayed number in step 278 as indicated, being then connected to the IVM server in step 284. A check 285 is run by the IVM server to see if the message is still stored within the IVM server. The message may be stored in storage module 623 (see FIG. 6) for later instant retrieval. If yes, the target user directly accesses and retrieves that message in step 287 as indicated. If no, the IVM server checks if the message was transferred to another storage server (not shown in step 289. Such as a voice-mail server (not shown) is coupled to server 106. Alternatively yet, the multi-media message may be kept within a MMS server (not shown) and the unified message may be kept in a unified messaging system (UMS) (not shown). These types of servers and their connection to a telephony or VoIP system or network are well known in the art. If yes, the IVM server further checks if there is a smart connection with the storage server in step 292. If such a connection exists (yes) the IVM server provides the storage server with the stored message ID number, enabling it to instantly access the message and play it to the target user in step 296. If no, the target user is connected to the storage server by the IVM server and is guided by the storage server's menu as to what to do in step 294. If the message was not transferred to another storage server in step 289, the retrieval process ends. Steps 289 and on describe a "delayed" instant message retrieval.

The "instant retrieval" refers to direct access to the specific voice and/or fax and/or multi-media and/or unified message, without the need listen to previous messages and/or system's greetings and/or system's operational instructions. This function is enabled by the instant retrieval module 122.

Alternatively, after step 276, if the message is still stored within the IVM server, the message is played instantly. If the message is not stored then either the IVM server contacts the voice-mail system and performs a smart retrieval (in which case the message is played instantly), or the IVM server does not do anything "smart" and just connects the retrieving user to the voice-mail system (in which case there's a regular message retrieval). Alternatively, a user can always access his/her voice-mail and try to retrieve any existing messages there. This may be done without the IVM server mediation, as explained above. If the message spoken is within the voice-mail system, the user will simply hear it.

The basic system described in FIG. 1a can be enlarged by the addition of optional elements to perform added functions. These are described below.

Figure 3:
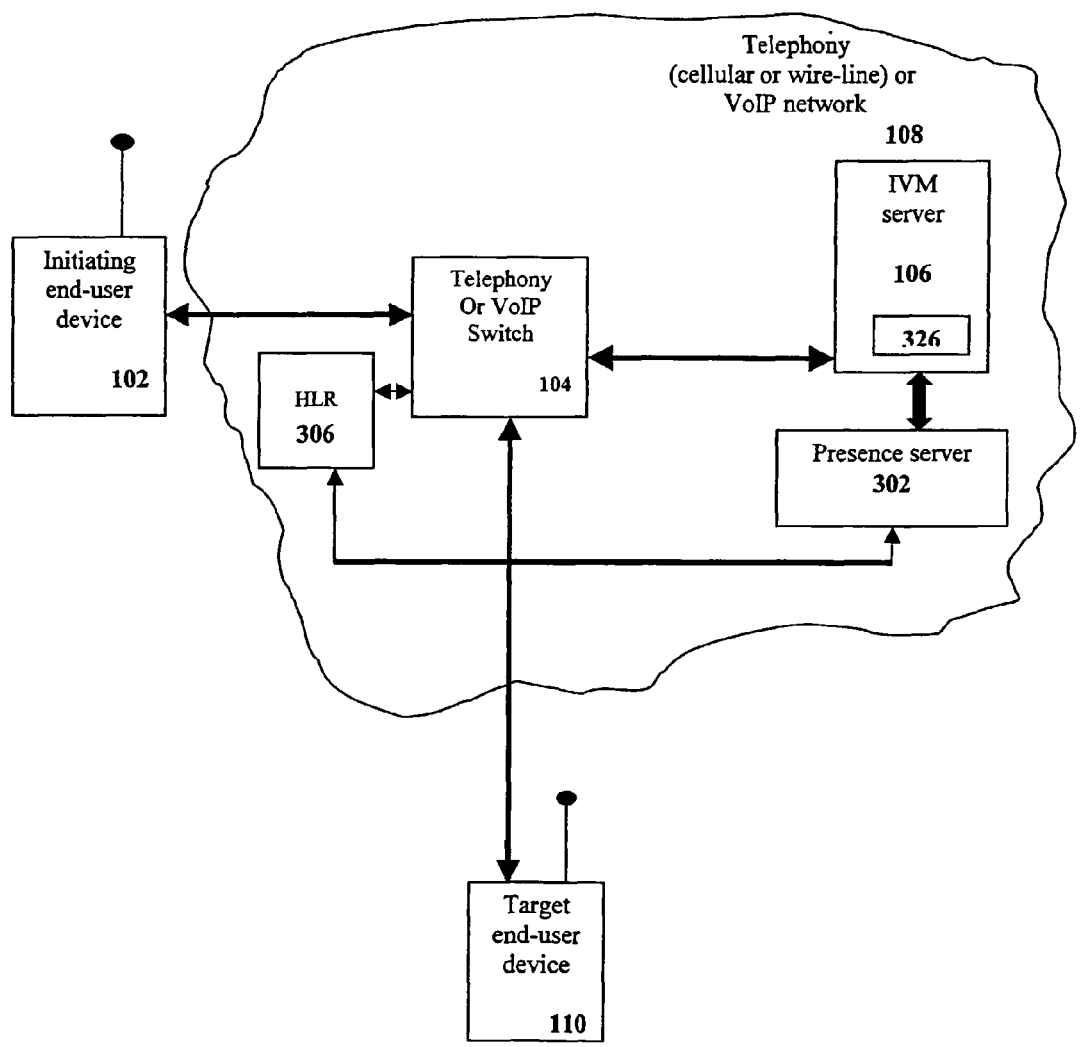
FIG. 3 shows another embodiment of an IVM system according to the present invention.

FIG. 3 shows another embodiment of an instant voice messaging system of the present invention. The figure shows a system 300 that comprises all elements of system 100 in FIG. 1a, plus an optional presence server 302. Presence servers allow a user to define whether he/she is available for receiving a message or not. Presence servers are well known in the art. Existing presence engines include those provided by ICQ, Odigo, Comverse ('Next 2 Me'), and AOL (AOL 'messenger'). In case a GMS cellular system is involved in the IVM, the presence server can be connected to a Home Location Register (HLR) 306. Presence server 302 is coupled to IVM server 106, and enables each user to define his/her presence parameter. This can be done for example by using another "smart" numbering method—e.g. by dialing "152 #0" the user defines him/herself as "off-line" and by dialing "152#1 the user defines him/herself as "on-line". The HLR stores information about cellular users. A simple presence criterion may be for example the fact that the target user's handset is switched ON or OFF. An ON or OFF handset switching action is registered by the HLR. The presence server interrogates the HLR gets this information and uses it as a simple presence (availability) criterion.

A presence parameter is a status that a user chooses to be in, as far as his/her availability or willingness to receive instant voice-messages is concerned. Such a status may for example include 'on-line', which means that the user is available and can receive an IVM; 'send me a message', which means the user is actually asking to receive instant voice messages; and 'off-line', which means the user is not available for instant voice messages. The presence status can be defined by dialing a dedicated number, which can be kept in the target user's device memory, and can therefore be dialed quickly and easily. This dedicated presence status number preferably includes two parts: the first part is the IVM prefix described above. The second part is a code that the IVM server interprets as a presence status. Therefore, if the IVM server receives a presence status command, it initiates communication with presence server 302 and updates a database located in the presence server (not shown).

In an exemplary case, assume that an initiating user wants to update its presence status to 'off-line'. The user dials for example 152 #* 111 054 987654. The IVM prefix "152" tells the telephony switch that this is an IVM session, and therefore this session is connected to the IVM server. "#*" tells the IVM server that this is a presence status update command. Therefore, the IVM server initiates a communication session with presence server 302. "111" tells the presence server that the user wants to become 'off-line'. The user is identified either by his/her caller ID or by the number that follows the presence status (in this case 054 87654). Accordingly, the presence server updates the presence status of the user whose telephone number is 054 87654 as 'off-line' in its database. In case a numbering method is adopted as setting the presence feature, or in case the presence status is obtained from the HLR, the presence server can be a module within the IVM server. Before setting up an instant voice messaging session with one or more target users, the IVM server can check the presence status of each target user, be it a single user or a user belonging to the group. In case the presence status is 'off-line', an IVM session will not be set, and the voice message will be stored within the IVM server until the target end-user becomes available for an IVM session. If a target user is unavailable for receiving an IVM session, a notification is sent to the initiating user during the creation of the IVM. The notification is preferably inserted as a special beep that will be sent by the IVM server to the initiating user.

Figure 4:
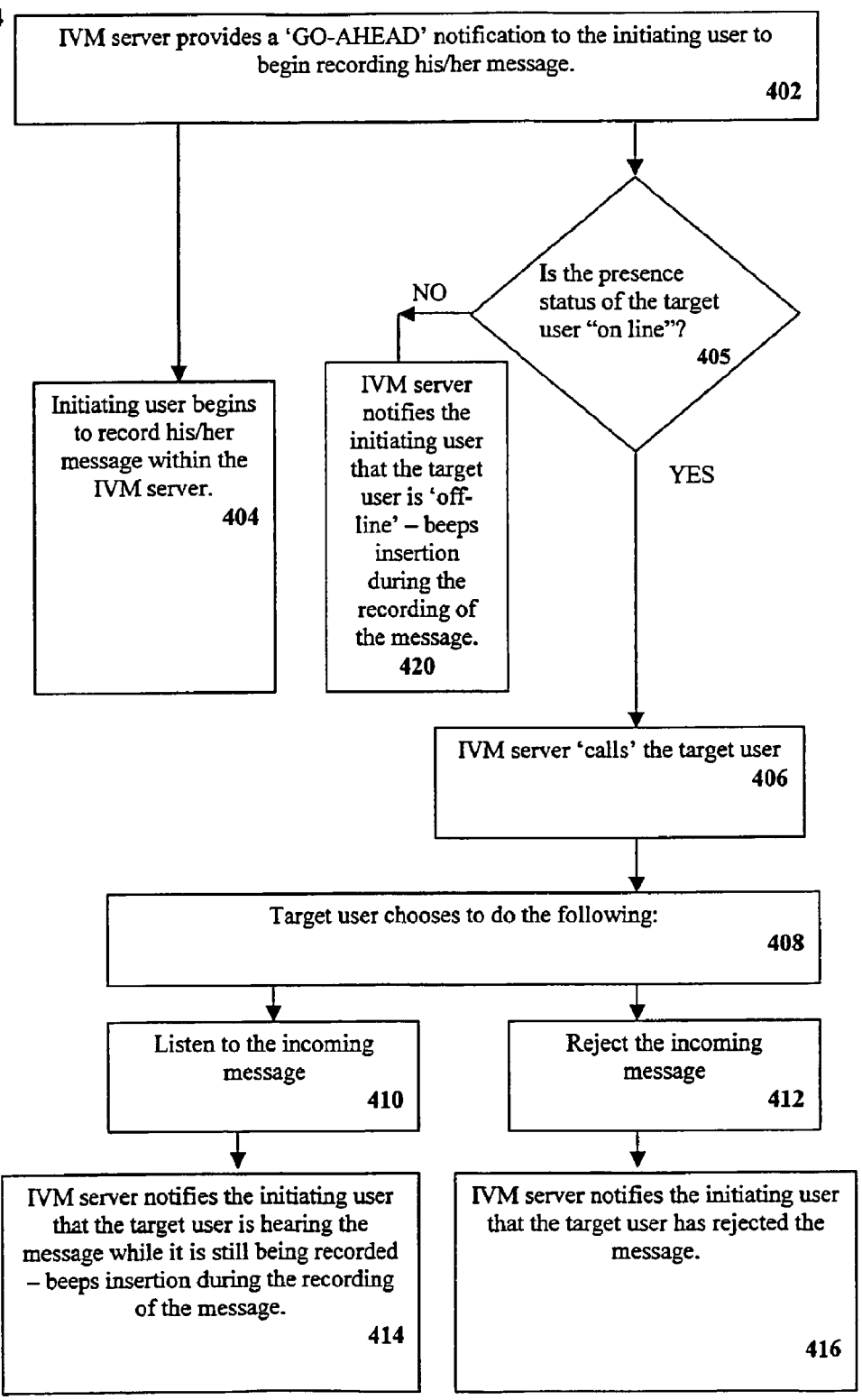
FIG. 4 shows an exemplary flow chart of an IVM server-to-initiating user notification procedure in the case of a message sent to a single target user.
Figure 6:
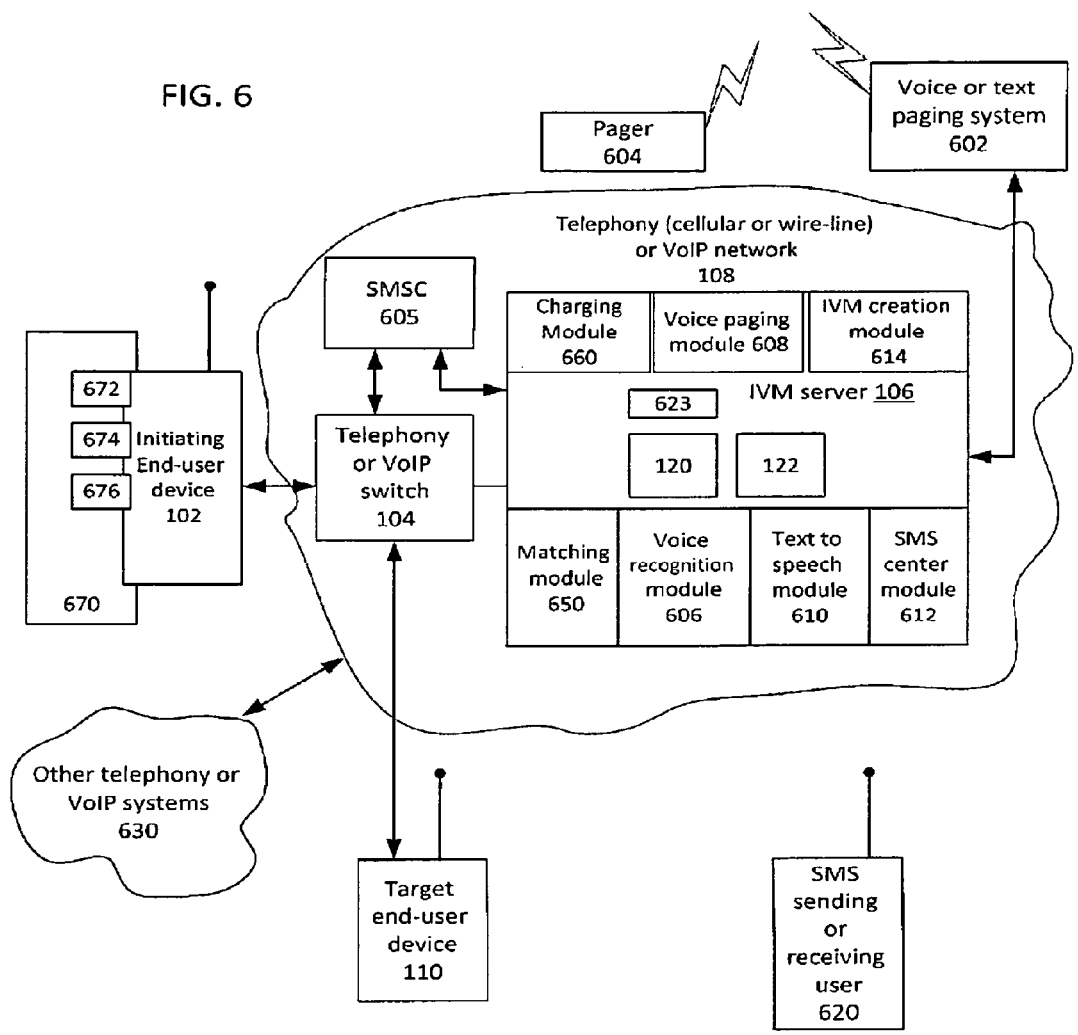
FIG. 6 shows yet another embodiment of the IVM system of the present invention that comprises a number of optional components in addition to those shown in FIGS. 1 and 3.

FIG. 4 shows an exemplary flow chart of an IVM server-to-initiating user notification procedure. The notifications are provided by the IVM server to an initiating user that initiates and sends an IVM message to a single target user. Immediately after the establishment of a voice session between the initiating user and the IVM server, the IVM server provides the initiating user (102) a 'Go Ahead' signal (beep etc.) in step 402. The initiating user starts recording his message in step 404. Essentially simultaneously in step 405, the IVM server can check the presence status of the target user, by communicating with the presence server (302 in FIG. 3). In case the target user in 'off-line' and cannot accept the IVM message, the IVM server notifies the initiating user by using a voice signal (by e.g. a series of fast repeating beeps) in step 420. IVM server-to-initiating user notifications may be sent by a short text message (SMS) or by initialization of an IVM session between the IVM server and the initiating user. The initialization of this session can be done by the server, which will have pre-recorded voice notifications. In case of SMS notifications, the IVM server will initiate communication with SMSC 605. Notification text messages may be stored within the IVM server and sent via the SMSC to a user as a text SMS message. It should be mentioned that in telephony networks, the SMSC is connected to the telephony switch as shown in FIG. 6

In case the target user is 'on-line' and able to receive the IVM message, the IVM server calls the target user in step 406. At this stage, the target user can choose to do the following: answer the incoming message call in step 410, reject the incoming message call in step 412, or do nothing and just let the phone ring (in which case no notification will be sent by the IVM server to the initiating user).

The IVM server can ask the switch to notify it that the target user has answered the session. In such a case, the IVM server will notify the initiating user (e.g. insert a special beep into the voice session it has with the initiating user) in step 414 that the target user has answered the session or has accepted the message. The IVM server may receive from the switch the duration of the session with the target user (CDR—Call Duration Registry). If this duration resembles the duration of the original message left by the initiating user, the IVM server can establish that the session was not only answered but also the message was heard. In case the target user has rejected the incoming IVM message in step 412 (e.g. by pressing 'end' on his handset), the IVM server can notify the initiating user by a voice signal (e.g. beeps) in step 416. Note that the target user may define an 'invisible status' in which the initiating user will not be able to receive notifications from the IVM server about the reception, rejection, etc. of the message that the initiating user has sent to target user. This can be done by dialing a dedicated number in a similar manner as the presence status is defined.

Figure 5:
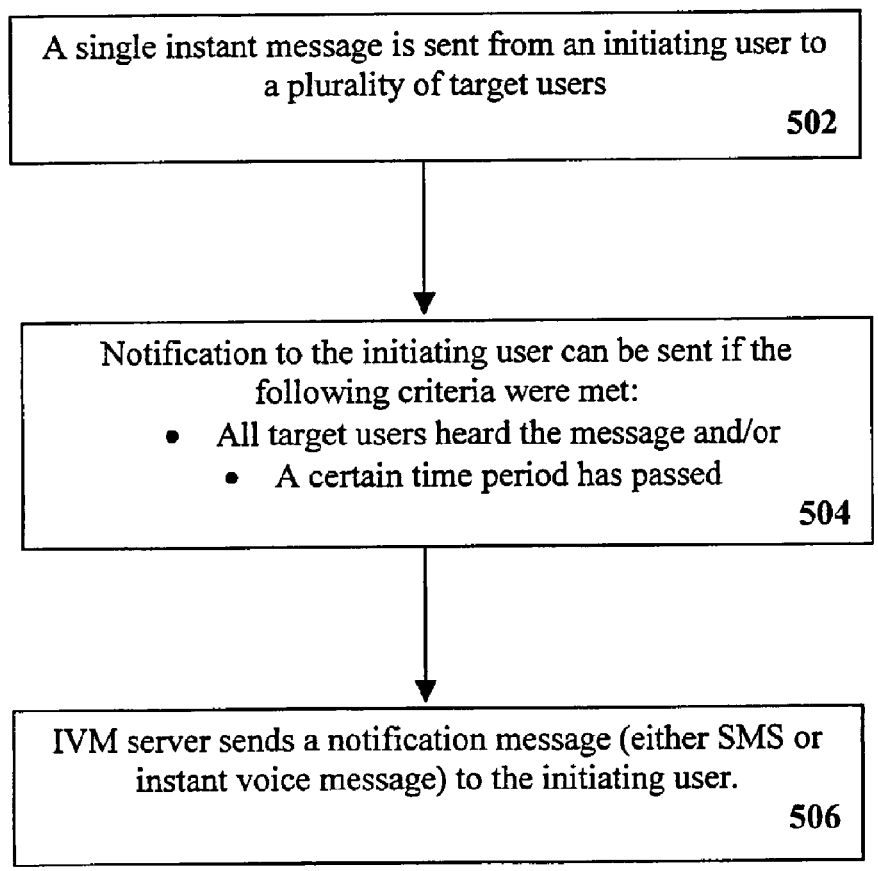
FIG. 5 shows an exemplary flow chart of an IVM server-to-initiating user notification procedure in the case of a message sent to a plurality of target users.

FIG. 5 shows an exemplary flow chart of an IVM server-to-initiating user notification procedure in the case of a message sent to a plurality of target users. The message is sent as described above to a plurality of target users in step 502. Because each target user can hear the incoming message at a different time (e.g. one answers after one ring tone, the second after three ring tones, etc.) there is a need for a different method for notifying the initiating user about real time status such as the message having been accepted (heard) or rejected. The notification may be sent to the initiating user in step 504 either when ALL target users have heard the IVM message, or after the passage of a predetermined period of time. In the latter case, the IVM may identify to the initiating user those target users who have listened to the message, and those who have not. The notification is sent in step 506, using one of the procedures described above.

FIG. 6 shows yet another embodiment of the IVM system 600 of the present invention that comprises a number of optional components in addition to those shown in FIGS. 1*a* and 3. These optional components may be added to the basic system configuration of FIG. 1*a* either individually, or in various combinations. For example, system 600 may comprise a voice and/or text paging system 602 that communicates with the IVM server, a text pager 604 that receives paging messages (voice or text) from paging system 602 and which, in some cases, can reply to the initiating user with a voice or text message, via the paging system, and an optional short message service center (SMSC) 605. SMSC 605 is coupled to IVM server 106, and, in a telephony or VoIP network such as network 108, further coupled to telephony or VoIP switch 104. System 600 may further comprise a voice recognition module 606 used for converting voice messages into text messages, a voice paging module 608, a text-to-speech module 610, an SMSC module 612, and an IVM creation module 614. These modules are preferably included in the IVM server. Network 108 may be further coupled to other telephony or VoIP networks 630

An initiating user can dial an instant messaging access number (e.g. 152) followed by a number that is unique to voice paging massages (e.g. 99999), and further followed by a target paging user number (identification code, e.g. 3963). In case that the paging system is a voice-paging system, the IVM server transforms this message into a voice-paging message (having a voice paging format) within voice-paging module 608, then transfers this message to voice paging system 602, which uses the target paging user's number in order to send him/her the message as a voice paging message.

In order to send a text message, after the IVM access code (e.g. 152), a number that is unique to text paging messages (e.g. 88888) followed by a target paging user number (e.g. identification code, e.g. 4175), is preferably dialed. Voice recognition module 606 is used to convert a voice message into a text message. In case the text paging system has a reply function (text reply), the replied text message from text pager 604 is transferred via text paging system 602 to the IVM server. This text message is transformed within the server from text-to-speech by module 610 and transformed into an IVM format by module 614. The message is then sent to the initiating user as an IVM message. Text-to-speech module 610 is needed also is the case when a text SMS message is sent to an initiating or target user, and when the SMSC number of this message is a number that belongs to SMSC module 612. By specifying a SMSC number that "belongs" to the IVM server (through module 612), the text SMS message will be received within the SMSC module 612, transferred to speech in text-to-speech module 610, transformed into an IVM format by module 614 and sent as an IVM message by the IVM server to the respective user. Yet another case in which the text to speech' module is needed is in the case where the text message may be an IP based text message (such as an ICQ message or e-mail message) or another type of text message. In such a case, an ICQ or e-mail message will be sent to a target user via the IVM server using the numbering method disclosed herein. For example, the IVM server can have an e-mail domain e.g. "IVM.com", and each user can have an e-mail address such as "123456@IVM.com". In case a user gets an e-mail, the IVM server will convert it into an IVM message using the text-to-speech module. In the case of ICQ, the IVM server can be identified as a user that has many ICQ numbers. Each ICQ number belongs to a different target user, and stored in a database within the IVM server. When an ICQ user sends an ICQ message to a target user, the ICQ message will reach the IVM server that is virtually registered as that ICQ user. The IVM server will then convert the ICQ text message into a speech message within the text-to-speech module, and send it as an IVM message to the target user that represents that ICQ number within the IVM server's data base.

IVM module 614 is used in case the IVM server has to send IVM messages that need to be prepared within the IVM server, e.g. notification messages. This module may also provide the IVM format to text messages or voice-paging messages that were transformed into IVM messages.

In another possible scenario, a telephony user would like to send an ICQ user a message that was originally a voice message (IVM). The ICQ user can be an IP device 704 (FIG. 7) running an instant text messaging software such as ICQ. In fact each ICQ user can be given a unique telephone number for this scenario (for receiving an instant voice messages). That telephone number will belong to the IVM server that receives the IVM message and will also have a list assigning such a phone number to ICQ number. The IVM server will transform the voice message into text in module 606 and will send this text message via an IP domain 702 (see description below in FIG. 7) to an IP user 704 (see description below in FIG. 7).

In a case in which one or more target users receive an instant voice message and cannot reply by speaking loudly (for example when in a meeting etc), the IVM may be displayed on each handset, for example as a message saying: "an instant voice message from . . . ". The target user(s) may then reply by an SMS. The reply by an SMS message can be done by using the sender's number, which is provided within the "caller ID".

The IVM server may further optionally comprise a "matching module" 650, which enables users to reach it either via the Internet or via a phone call and an IVR (Interactive Voice Response), and to establish a set of criteria for enabling the IVM server to send back an IVM message. In such a case, the IVM server will be able to send an IVM to several users at a time and these users will also be able to instantly establish a two-way voice conversation among themselves.

The IVM server may further optionally comprise a "smart charging" module 660, which enables the telephony system to provide a 'smart' charging for the IVM service, e.g. in case when the target user chooses to establish a two-way phone call after receiving an IVM message. The smart charging module will notify the billing system of the telephony system that at this stage the party to be charged is the target user.

The system of the present invention, in any of its embodiments, may further include a special handset 670 provided to each user. Handset 670 comprises a set of buttons that included "dedicated" buttons such as a dedicated IVM button 672, a dedicated SMS button 674, a dedicated PTT button 676 etc. The initiating user chooses a target telephone number, then presses the dedicated button for the required functionality. Thus, pressing IVM button 672 automatically enables the initiating user to send an IVM to the target user, pressing SMS button 674 automatically enables the initiating user to send an SMS to the target number, pressing PTT button 676 automatically enables the initiating user to send a PTT message to the target user etc. The same may be done with email, paging (voice, text), instant IP text messages (e.g. ICQ) etc. The set of buttons is thus improving the menu-based handset operation.

Figure 7:
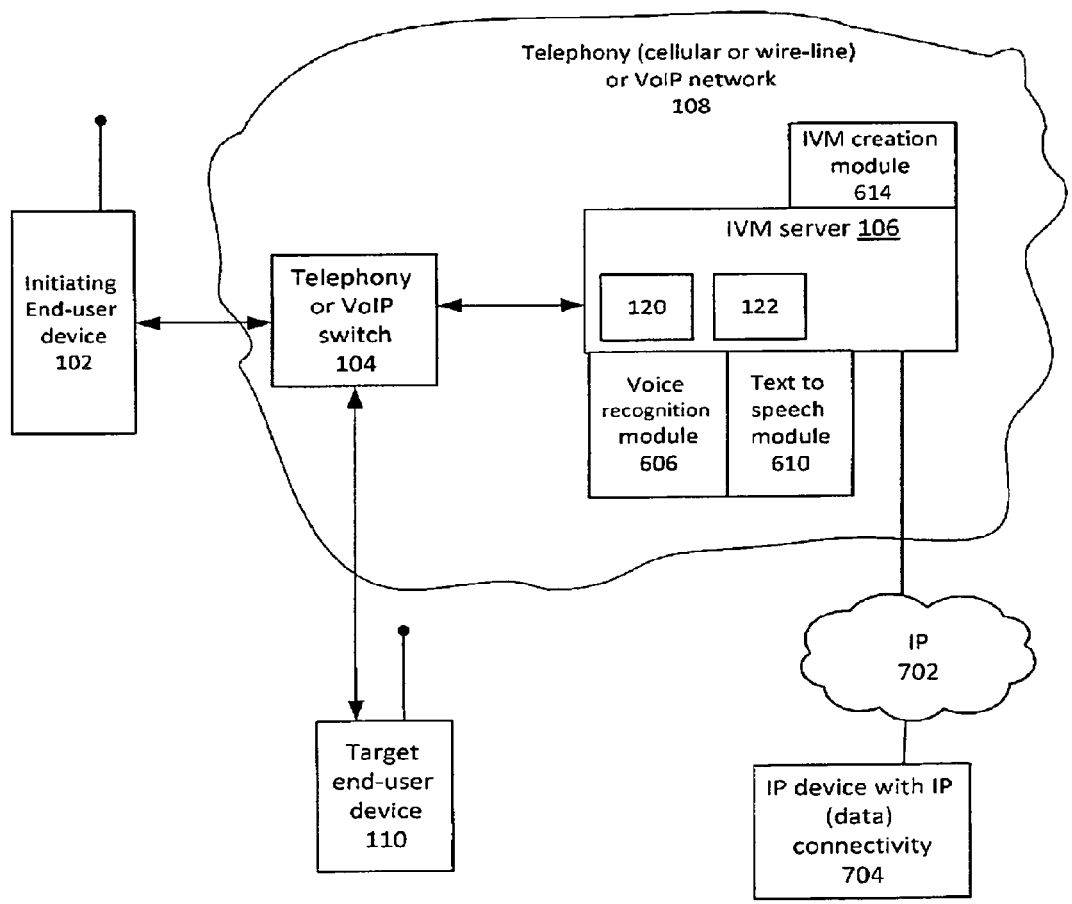
FIG. 7 shows yet another embodiment of the IVM system of the present invention, in which the IVM server is connected to an IP (data) domain by VoIP technology.

FIG. 7 shows yet another embodiment of the system of the present invention, in which the IVM server is optionally connected to an IP (data) domain 702. This allows instant voice messaging to be sent from a telephone device of a user to one or more IP devices 704, which can be VoIP phones or personal computers (PCs), or any other device with a data (IP) connection running text or voice messaging software. The IVM server can identify an instant voice message that is targeted to a VoIP client by, for example, simply adding a suffix to the number dialed by the initiating user. This number can be an IVM access number e.g. "152" or an IVM access number followed by regular phone numbers that were assigned to IP devices. After this suffix, there is a target IP user's IP address 192.168.100.11 where instead of '.' a "#" can be used. The whole number to dial can be for example 152 192#168#100#11 or 152 54 123456 192#168##11#11, where 54123456 is an IP user's assigned phone number. Also, a suffix may be omitted if each IP user gets a dedicated (regular, telephony) phone number. or another IP identification (e.g. e-mail address). A device 704 (a including telephony software client running on a PC) may send instant voice messages to circuit switched telephony (regular telephony) users by, for example, indicating the IP address of the IVM server followed by the target user's telephone number(s).

Note that IP devices can be textual devices such as ICQ or email running on a PC, or VoIP devices e.g. a VoIP software running on a PC. In case the target device is a textual IP device (i.e. the target user is defined as a text user), the initial IVM message is preferably transformed into a text message using voice recognition module 606. Each IP user can be assigned a telephone number. This number will be kept together with the IP address of that user within a database in the IVM server. Telephony system 108 will assign these telephone numbers to the IVM server, and each time the initiating user will send an IVM message to that telephone number, the IVM server will receive that message, will transform it into a text message as described, and will send it as a text message to the text IP based user 704. In case the target IP user 704 is a VoIP user (VoIP software running on a PC), the initial IVM message will not be transformed into a text message. The database within the IVM server is updated regarding the IP target user nature (textual or voice). This database includes a special set of telephone numbers that are registered within the IVM server and which enable the IVM server to perform this interconnection with the IP data world. Alternatively, a suffix can be added to the dialed number (e.g. suffix *01 for a text user and *02 for a voice user), providing the IVM server with the information whether the target user is a text or a voice user.

FIG. 8 shows yet another embodiment of the system of the present invention, in which the IVM server includes a PTT module 802 and is connected to a legacy PTT system 804 or an IP based (VoIP) PTT system 806, in order to enable instant voice messages to be sent and/or received to/from PTT systems. This connectivity can be implemented for example by using yet another numbering format, e.g. using a prefix "154" instead of dialing the exemplary "152" prefix (which indicates that this is an IVM session). The "154" prefix will be identified by the telephony switch as a call to the IVM server. However, the IVM server will identify "154" as a message that goes to a PTT system, followed by the number of a PTT target user 806 or a VoIP PTT user 812.

When a PTT user 810 or a VoIP PTT user 812 decides to send a PTT message to a certain telephone number and, if a PTT system recognizes the target number as not belonging to a PTT registered user, the PTT system will transfer this message to the IVM server. The IVM server will then convert the PTT type message into an IVM format, and send this message to the required target user(s). Alternatively, the IVM server can be a PTT subscriber having a PTT module 802 that will receive and/or send PTT messages (the same way a done by a PTT user 810 or a VoIP user 812) to and/or from PTT systems. However, each IVM user will preferably have a unique 'PTT' user number that will be registered within the PTT system as an IVM number. Therefore, the PTT message will be transferred to the IVM server. The IVM server will have a database that will match PTT numbers with regular telephone numbers, and each user will have such a unique match. Therefore, the received PTT message will be received in PTT module 802, then transformed to IVM format in IVM creation module 614 and sent to the target IVM user. The IVM user will be able to e.g. reply 250 the message which will require the IVM server to transform the reply into PTT format (by PTT module 802) and send the reply to legacy PTT system 804 or IP PTT system 806, which will forward this message to respectively legacy PTT users 810 or VoIP PTT users 812.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method comprising:
enabling an initiating user, using an end-user device, to choose a group of target users that comprises at least one target user and to press an IVM (instant voice message) dedicated button; and
in response to pressing the IVM dedicated button preceded by choosing the group of target users, enabling to send an instant voice message, wherein the enabling to send comprises:
starting a recording of the instant voice message;
after the starting of the recording, sending to the at least one target user a notification with regard to the instant voice message; and
in a case when the notification is acknowledged, enabling playing already recorded parts of the instant voice message to the at least one target user.

2. The method of claim 1 further comprises enabling the initiating user to choose the at least one target user from target users presented by using the end-user device.

3. An end-user device comprising:
an IVM (instant voice message) dedicated button for sending instant voice messages;
wherein the end-user device is configured to enable an initiating user to choose a group of target users that comprises at least one target user and to enable the initiating user to press the IVM dedicated button; and
wherein in response to pressing the IVM dedicated button preceded by choosing the group of target users, the end-user device is configured to enable sending an instant voice message, by:
enable starting a recording of the instant voice message;
after the starting of the recording, enable sending to the at least one target user a notification with regard to the instant voice message; and
enable sending already recorded parts of the instant voice message to the at least one target user for playing the instant voice message, in a case when the notification is acknowledged.

4. The end-user device of claim 3 is configured to enable the initiating user to choose the at least one target user from target users presented by the end-user device.

5. The end-user device of claim 3, wherein the end-user device is a cellular handset.

6. The method of claim 1 comprising notifying the initiating user when the instant voice message is accepted.

7. The method of claim 1 comprising notifying that the instant voice message has been heard.

8. The method of claim 1 comprising notifying the initiating user which target users of the group of target users have listened to the instant voice message.

9. The method of claim 1 comprising notifying the initiating user that the instant voice message is being heard during the recording of the instant voice message.

10. The method of claim 1 comprising sending the notification to the least one target user before completing the recording of the instant voice message.

11. The method of claim 1 further comprising establishing a connection between the initiating user and an IVM server for sending the notification and for sending the instant voice message to the at least one target user.

12. A non-transitory computer readable medium that stores instructions that once executed by a computer cause the computer to execute the steps:
enabling an initiating user, using an end-user device, to choose a group of target users that comprises at least one target user and to press an IVM (instant voice message) dedicated button; and
in response to pressing the IVM dedicated button preceded by choosing the group of target users, enabling to send an instant voice message, wherein the enabling to send comprises:
starting a recording of the instant voice message;
after the starting of the recording, sending to the at least one target user a notification with regard to the instant voice message; and
in a case when the notification is acknowledged, enabling playing already recorded parts of the instant voice message to the at least one target user.

13. The non-transitory computer readable medium of claim 12 further stores instructions for notifying the initiating user when the instant voice message is accepted.

14. The non-transitory computer readable medium of claim 12 further stores instructions for notifying the initiating user that the instant voice message has been heard.

15. The non-transitory computer readable medium of claim 12 further stores instructions for notifying the initiating user which target users of the group of target users have listened to the instant voice message.

16. The non-transitory computer readable medium of claim 12 further stores instructions for notifying the initiating user that the instant voice message is being heard during the recording of the instant voice message.

17. The non-transitory computer readable medium of claim 12 further stores instructions for establishing a connection between the initiating user and an IVM server for sending the notification and the for sending of the instant voice message to the at least one target user.

* * * * *